United States Patent
Bagratashvili

(10) Patent No.: US 9,523,779 B2
(45) Date of Patent: Dec. 20, 2016

(54) METHOD FOR IDENTIFYING A SEISMIC EVENT AND A SEISMIC DETECTOR FOR IMPLEMENTING SAME

(71) Applicant: ANGRYMOLE TECHNOLOGIES LTD., Petah Tikva (IL)

(72) Inventor: Nodari V. Bagratashvili, Moscow (RU)

(73) Assignee: ANGRYMOLE TECHNOLOGIES LTD., Petah Tikva (IL)

( * ) Notice: Subject to any disclaimer, the term of this patent is extended or adjusted under 35 U.S.C. 154(b) by 316 days.

(21) Appl. No.: 14/100,922

(22) Filed: Dec. 9, 2013

(65) Prior Publication Data

US 2014/0092711 A1 Apr. 3, 2014

Related U.S. Application Data

(63) Continuation of application No. PCT/RU2011/000510, filed on Jul. 11, 2011.

(30) Foreign Application Priority Data

Jun. 9, 2011 (RU) ................. 2011123387

(51) Int. Cl.
  G01V 1/00 (2006.01)
  G01V 1/28 (2006.01)
  G08B 21/10 (2006.01)
(52) U.S. Cl.
  CPC ............. G01V 1/001 (2013.01); G01V 1/288 (2013.01); G08B 21/10 (2013.01)
(58) Field of Classification Search
  CPC .......... G01V 1/288; G01V 1/001; G08B 21/10
  (Continued)

(56) References Cited

U.S. PATENT DOCUMENTS 3,818,471 A * 6/1974 Kurschner ......... G08B 13/1663
  340/566
4,001,771 A 1/1977 Amrine
(Continued)

FOREIGN PATENT DOCUMENTS

RU 2204849 C1 5/2003
RU 2273867 C1 * 4/2006
(Continued)

OTHER PUBLICATIONS

International Search Report for International Application No. PCT/RU2011/000510 filed Jul. 11, 2011, mailed Feb. 24, 2012.

*Primary Examiner* — Daniel L Murphy
(74) *Attorney, Agent, or Firm* — Patentbar International, P.C.

(57) ABSTRACT

A method for identifying a seismic even makes it possible to determine the direction to a source of a seismic disturbance both on the surface and in a three-dimensional space and increases the probability of correct identification of a seismic event and the accuracy of the determination of the direction to the source. A compact seismic detector for implementing the method reduces the cost of scanning and servicing a perimeter protection system constructed on the basis of such detectors. In the method, two or three pairs of seismic sensors which are divided by a distance and are oriented at an angle with respect to one another, for example mutually perpendicularly along the axes X, Y or along the axes X, Y, Z, respectively, are combined to form one seismic detector. The resultant seismic data are processed to determine the direction to the source of the seismic disturbance.

12 Claims, 8 Drawing Sheets

(58) Field of Classification Search
USPC .......................................... 367/40, 129, 43
See application file for complete search history.

(56) References Cited

U.S. PATENT DOCUMENTS

| | | | | |
|---|---|---|---|---|
| 4,012,649 | A | * | 3/1977 | Cook .................. G08B 13/10 |
| | | | | 310/330 |
| 7,202,797 | B2 | | 4/2007 | Zhavi |
| 7,598,884 | B2 | | 10/2009 | Lachenit |
| 7,982,861 | B2 | * | 7/2011 | Abshire .............. H04L 25/4902 |
| | | | | 356/5.11 |

FOREIGN PATENT DOCUMENTS

| | | |
|---|---|---|
| RU | 2410751 C1 | 1/2011 |
| SU | 1377795 A1 | 2/1988 |
| WO | 2010/090752 A1 | 8/2010 |

\* cited by examiner

| Ø (a+0.2 м)   | Ø (a+0.2 m)   |
| Ø (0.2-0.3 м) | Ø (0.2-0.3 m) |
| (0.2-0.3 м)   | (0.2-0.3 m)   |

METHOD FOR IDENTIFYING A SEISMIC EVENT AND A SEISMIC DETECTOR FOR IMPLEMENTING SAME

RELATED APPLICATIONS

This Application is a Continuation application of International Application PCT/RU2011/000510, filed on Jul. 11, 2011, which in turn claims priority to Russian Patent Applications No. RU 2011123387, filed Jun. 9, 2011, both of which are incorporated herein by reference in their entirety.

FIELD OF THE INVENTION

The invention pertains to the area of technical means and methods of protection and can be used for detection of moving trespassers at a distance of up to 40 meters by their seismic signals for protection of territories and access ways to various facilities.

Steps of human or big animals and impacts of digging tool (pick, shovel etc.) are understood as the seismic disturbances recognized by the detector as a seismic event. The event is considered detected if the signal level exceeds a preset value. The alarm signal is thus generated.

BACKGROUND OF THE INVENTION

The systems, built on the basis of simple detectors (U.S. Pat. No. 4,001,771, issued on Jan. 4, 1977, G08B 13/00), which contain one or several seismic sensors, analog-to-digital converters and digital processing module are known. These detectors calculate the power of the seismic signal and, if the power value exceeds the preset threshold, recognize the seismic event at the distance $L_{MAX}$—maximum distance between the detector and the seismic disturbance source, at which the disturbance signal is recognized by the detector as a seismic event. The chain of such detectors forms a security system.

Disadvantage of this kind of the systems is that detectors do not determine the direction to disturbance source, therefore it is impossible to identify, where the event took place—within the protected zone or beyond its boundaries. Only to localize the disturbance source, inside or outside of the security zone, it is necessary to install two parallel chains of detectors at the distance of about $L_{MAX}$. A double number of detectors and connecting cables and double labor costs for installation of the system are thus required.

The system (application WO2010090752, publication of Aug. 12, 2010, H04B 1/06), enabling to identify that the disturbance source is underground, is also known. For this purpose, one of the sensors is installed close to the surface, and the second is installed at a greater depth. The processing method requires the upper sensor to recognize the surface wave, and the lower one mainly the volume wave.

Disadvantage of the system shortage is that, to ensure the functioning of the system, the lower sensor is buried at a depth of about 3-6 m, which makes the installation work much more expensive. In the vertical direction, this detector recognizes only two values 'underground'-'surface', but it doesn't determine the direction to the underground disturbance source.

The closest engineering solution to the disclosed invention is the security system detector (U.S. Pat. No. 7,202,797, publication Apr. 10, 2007, G08b 21/00) for protection of an extended facility, e.g. a pipeline. The system consists of a set of detectors. Each detector consists of several seismic sensors installed sequentially in a line at a short distance to each other (1-3), and this line is perpendicular to the protected pipeline. Outputs of the sensors are connected to the analogue-to-digital converters of the digital processor. Each detector determines the phase shift for each pair of sensors and, based on the phase shift, the direction of the disturbance source. The evaluation of the corresponding angle demands the knowledge of the seismic wave velocity. The velocity is a variable value, therefore the detector is equipped with an active disturbance source, and the velocity of the seismic wave is calculated at its periodic activation.

Disadvantage of the said device is the presence of additional technical means for generation of the reference seismic disturbance and measurement of the velocity of the seismic wave from this disturbance. Another disadvantage of the device is that it doesn't determine the direction to the underground seismic disturbance source.

SUMMARY OF THE INVENTION

The problem the invention is aimed at is to provide a method of the seismic event recognition, which will enable determination of the direction to the seismic disturbance source both on surface and in the three-dimensional space (an underground source), improve the probability of correct recognition of the seismic event and accuracy of determination of direction to the source, as well as to provide a compact seismic detector for implementation of the method that will enable a reduction in the cost of deployment and servicing of the perimeter security system based on such detectors due to the compactness of detectors.

This problem is resolved by that the method of the seismic event detection provides for combination of two or three pairs of distant seismic sensors, located at an angle to each other, for example mutually perpendicularly along the axes X, Y or axes X, Y Z, respectively, in one seismic detector and subsequent processing of the received seismic data in order to determine the direction to the seismic disturbance source.

The conventional method of localization of the signal source by the 'time difference of arrival' TDOA is known. This method provides determination of the time delay in the reception of the signal from one source by two or more independent receivers. The difference is, as a rule, defined by the maximum of the cross-correlation function from a pair of the spaced receivers. By calculating the delays of several independent pairs of receivers, it is possible to determine the direction of the signal source.

This method is efficient in homogeneous environments with a stable signal velocity, e.g. for distribution of radio waves on the air or acoustic waves in the air space.

Seismic signal, being to some extent similar to an acoustic signal, essentially differs from it as, firstly, the distribution medium is not homogeneous and the distribution velocity is not stable; secondly, there are the effects arising at the earth-air interface. Therefore, the direct use of the TDOA method for determination of the direction of a seismic disturbance source leads to absolutely random results and impossibility to use this method.

The proposed method provides for simultaneous cyclical processing of signals in each pair of the sensors, where the cross-correlation in the time interval T is calculated in each processing cycle.

Maximum value of the cross-correlation $R_{MAX}$ and values of the time shift $\Delta T$ corresponding to them are selected for each pair of the sensors in each cycle, whereby the data stream of the selected values $R_{MAX}$ is analyzed and the seismic event recognized as significant when the selected cross-correlation values at least for one pair of the sensors exceed the current noise cross-correlation level by (2-3) times, after which during time $T_{MAX}$ the maximum value of the selected cross-correlation values is determined and the corresponded to it the time shift value $\Delta T$ is saved for each of the mutually perpendicular pairs of the sensors, whereby, when the second consistent maximum of the cross-correlation values $R_{MAX}$ is detected, the values of the time shift $\Delta T$ corresponding to the second maximum of the selected cross-correlation values is saved. Direction to the seismic signal source is determined as the direction of the vector sum of two or more pairs of the orthogonal (noncollinear in the general case) vectors corresponding to the pairs of the sensors where the direction of each vector is the direction from the first sensor to the second sensor of the pair, and the modulus of the vector is equal to the stored $\Delta T$ value for the recognized seismic event of the given pair of the sensors.

To improve the accuracy of the evaluation of the direction to seismic event source, the values of the time shift $\Delta T$ for each pair of the sensors are calculated as the mean value of the samples in the neighborhood of the cross-correlation maximum.

To determine the azimuth to the seismic event source, the time shift for two pairs of the sensors placed along the orthogonal axes X and Y are found on the plane and the planar azimuth is defined as $\text{arctg}(\Delta T_y/\Delta T_x)$, where $\Delta T_y$ and $\Delta T_x$ are the stored time shift values along the axes Y and X, respectively.

To determine the direction in a three-dimensional space, the time shift for the third pair of the sensors disposed vertically along the axis Z is additionally determined, and the vertical angle is determined as $\text{arctg}[\Delta TZ/\sqrt{(\Delta TY^2 + \Delta TX^2)}]$, where $\Delta TX$, $\Delta TY$ and $\Delta TZ$ are the stored time shift values along the axes X, Y and Z, respectively.

The problem is also resolved by that the seismic detector, containing the seismic sensors, the outputs of which are connected to the inputs of the synchronized analog-to-digital converters of the sensor signals processing unit, also contain additional sensor signals processing units, logical unit, and a unit for evaluation of the seismic event source direction; the seismic sensors, receiving only vertical oscillations, are grouped in pairs, and the distance between the sensors in all pairs is equal; each sensor of single pair is connected to the input of the analog-to-digital converter of the processing unit of the signals of the sensors, the first outputs of which are connected to the logic unit, recognizing the seismic event, and the second outputs are connected to the unit of direction evaluation to the seismic event source; the first output of the logic unit is the output of the device, and the second output of the logic unit is connected to the enabling input of the direction evaluation unit, whereby the processing unit for the pair of signals additionally contains two bandpass filters, cross-correlation calculator with a searching for the maximum value and corresponding time shift and two integrating filters, whereby the inputs of the bandpass filters are connected to the outputs of the analog-to-digital converters; the outputs of these filters are connected to the cross-correlation calculator inputs; and the calculator outputs are connected to the inputs of the integrating filters, the outputs of which are the outputs of the signal pair processing unit. The distance between the sensors in each pair is equal and makes from 0.4 to 0.8 m.

To improve the accuracy of the time difference, a multichannel integrator, the inputs of which are connected to the second outputs of the signal pair processing unit and the outputs to the corresponding inputs of the unit for evaluation of the seismic disturbance source direction, is provided.

The detector, determining the surface azimuth of the disturbance source, contains two pairs of the sensors, the axes of which are mutually perpendicular, and two signal pair processing units.

For evaluation of the direction in a three-dimensional space, the third pair of the sensors and the third signal pair processing unit are added, whereby the sensors of the third pair are placed in the immediate vicinity of the first two pairs and installed vertically one under another. The proposed device is processing the signal from the pair of approximate sensors; therefore, the lower sensor can be buried only at the depth of 0.5 m.

Increase in the probability of the correct recognition of the seismic event is achieved due to the analysis of the cross-correlated power of two signals. The signal of each sensor of the pair can sharply increase, but when the signals are not correlated, the level of cross-correlation remains the same, which reduces the probability of a false alarm. Improvement in the accuracy of determination of direction to the disturbance source is achieved by that the angle is calculated upon the results of the slower wave processing.

The detector built on the basis of the proposed method is implemented in a compact construction, which enables essential reduction of the expenses for its installation and servicing. A chain of such detectors combined in a network, forms a perimeter security system, whereby no active source of periodic disturbance is required for operation of the system.

BRIEF DESCRIPTION OF THE DRAWINGS

The invention is explained with the drawings.

DETAILED DESCRIPTION OF THE
PREFERRED EMBODIMENTS

Figure 1:
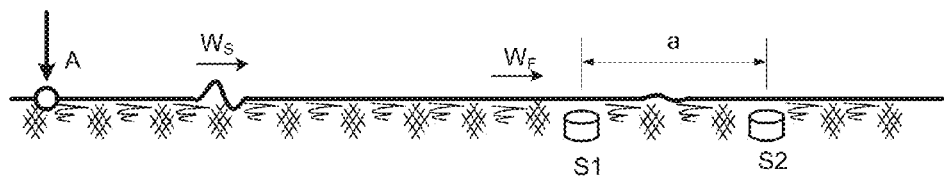
FIG. 1 shows the principle of distribution of a seismic wave and its receiving by a pair of seismic sensors.

The basis of the detector (FIG. 1) is the pair of sensors S1 and S2. In the course of seismic disturbance, there are volume and surface elastic waves. It is known that the velocity of longitudinal volume waves is approximately by 1.7 times more than the velocity of transversal volume waves and surface waves; therefore, we will conditionally refer to the longitudinal volume waves as the fast wave ($W_F$), and the remaining waves as the slow wave ($W_S$). Besides, it is known that the transversal volume wave attenuates faster than the surface waves; therefore, the slow wave basically consists of surface waves. It is established in practice that the velocity of a slow wave in clay or sandy soil is about (100-300) m/s and that of the fast wave about (200-500) m/s. It is established in practice that the slow wave $W_S$ carries the main portion of the wave energy, about 70%; therefore, it propagates much further than the fast wave $W_F$. Therefore, unlike the fast wave, the slow wave is always present in the arriving seismic signal. It is experimentally proved that both slow and fast waves cause vertical oscillations of the surface soil layer, therefore the one-component sensors are installed in the ground vertically, receiving mainly vertical oscillations and being therefore the receivers, which are set to receive mainly the vertical component of the arriving seismic waves. The distance between the sensors of the pair is equal to a. The value of the distance a is determined by several requirements. On the one hand, the increase in the distance between the sensors allows to increase the measurement accuracy for the time shift of the signal receiving by two sensors; on the other hand, the reduction in the distance between the sensors increases values of the cross-correlated functions due to the higher conformity of the sensor signals and reduces the detector dimensions. Based on the above reasons, a is selected in the range of (0.4-0.8) m.

It is established in practice that the slow wave velocity for clay or sandy soils is in the range of (100-300) m/s; therefore, the maximum delay of the signal between the sensors is (1.7-5) ms for the distance of 0.5 m between the sensors.

Significant components of the frequency spectrum of the arising seismic oscillations is in the range of (20-300) Hz; therefore, the sampling frequency of 1000 Hz (period=1 ms) meets the Nyquist criterion. However, to improve the measurement accuracy for the time shift, sampling frequency is increased till $F_S=4$ kHz ($t_S=0.25$ ms). The recalculate period for the cross-correlation functions ($t_{CC}$) includes an integer number of sampling periods $t_S$ and is $t_{CC}=1$ ms.

Figure 2:
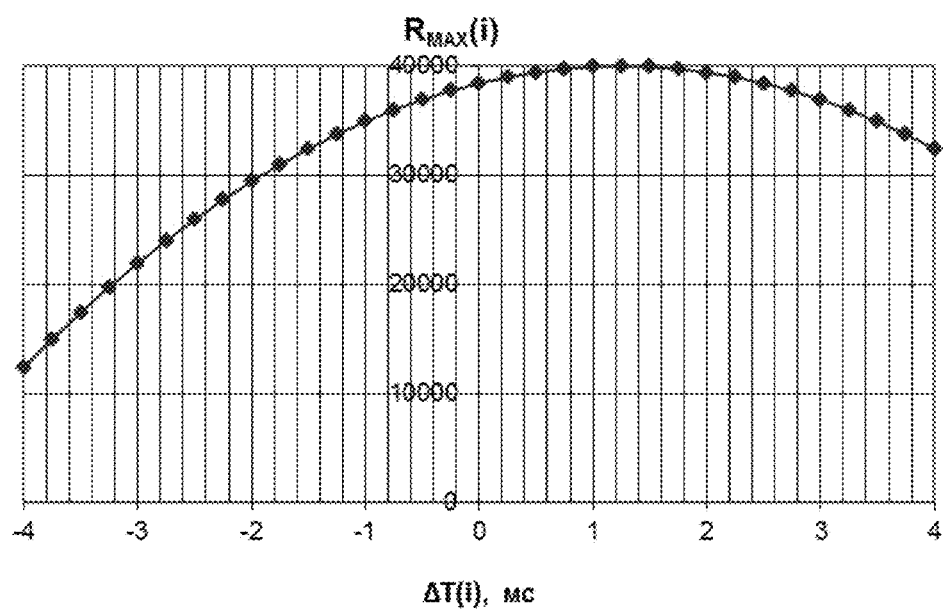
FIG. 2 shows an example of determination of the current value of the time difference of signal arrival for one realization of the cross-correlation function.

The cross-correlation function is calculated during each $t_{CC}$ cycle in a constant time interval of about $T_w=(32-64)$ ms. During calculation of the cross-correlation function, the maximum value $R_{MAX}(i)$ and corresponding time shift $\Delta T(i)$ are found. The example of one realization of the cross-correlation function is presented in FIG. 2, where can be seen that $R_{MAX}(i)=4,000$ and $\Delta T(i)=1.25$ ms in this cycle. The selected values $R_{MAX}(i)$ and $\Delta T(i)$ are filtered by the integrating filters; the filtered values $R_{MAX}(i)$ and $\Delta T(i)$ are used in the further processing.

Figure 3:
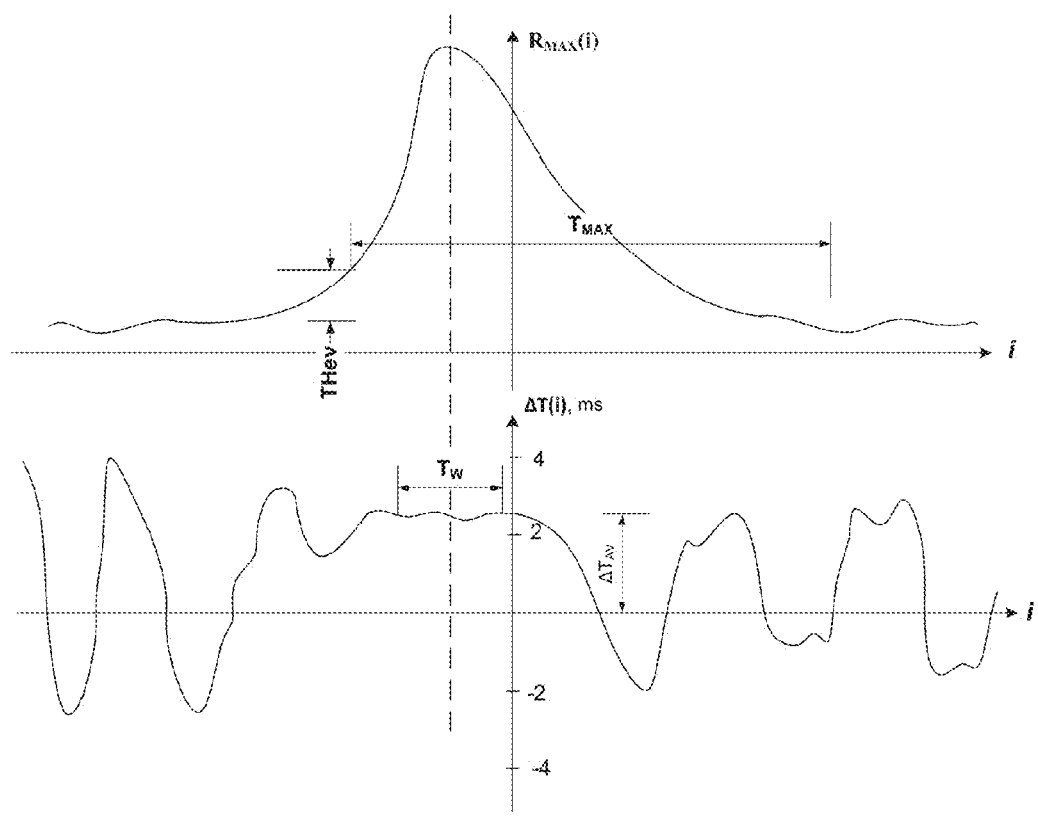
FIG. 3 shows an example of determination of the seismic event and selection of the shift time value based on the maximum value of the maxima of the cross-correlated functions.

FIG. 3 shows the typical realization of a seismic event for one of the pairs of the sensors. The event is determined by the selected maximum cross-correlation values, i.e. only the cross-correlated power of the signal is analyzed. Thus, the signal of each sensor of the pair can sharply increase, but if the signals are not correlated, the cross-correlation level remains the same, which reduces the probability of a false alarm. As is shown in FIG. 3, the time shift $\Delta T$ between the signals of the sensors is stabilized in the neighborhood of the cross-correlation maximum; therefore, the sequence of the procedures for the event determination must be as follows:

The event beginning is determined by sharp increase in the cross-correlation value for one of the pairs of the sensors.

The correlation maximum is found upon determination of the beginning of the event.

The value $\Delta T$ is averaged in the neighborhood of the maximum and these averaged values $\Delta T_{AV}$ are further used for calculation of the azimuth of the disturbance source for this specific event.

Figure 4:
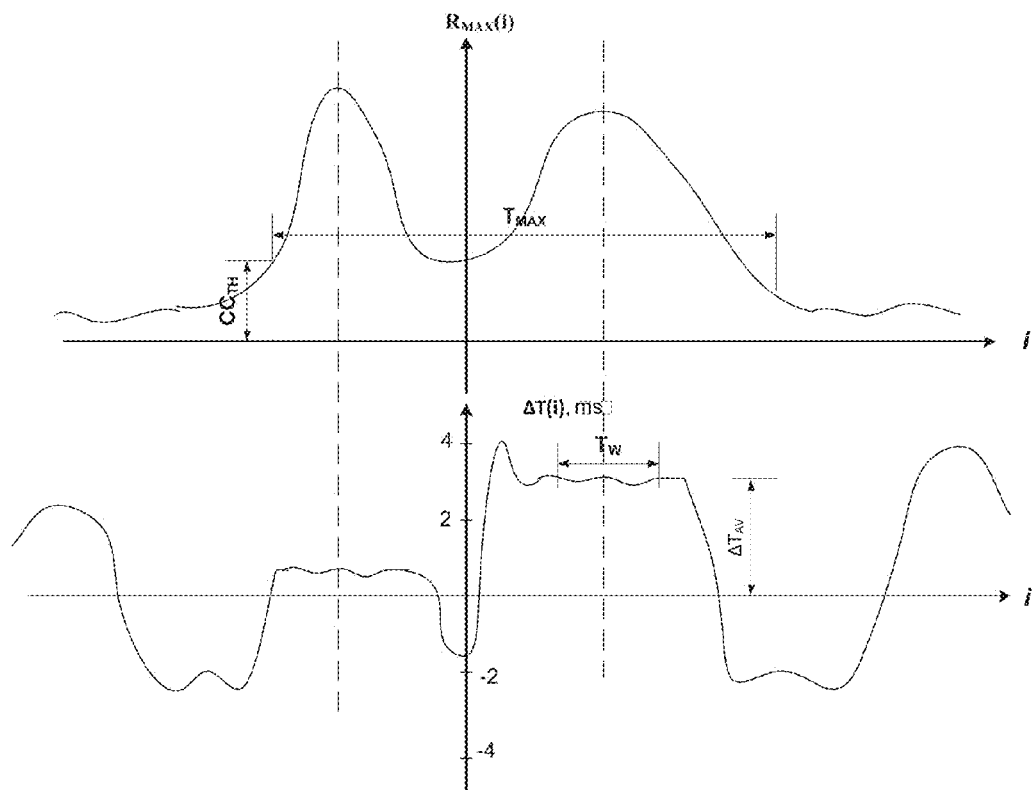
FIG. 4 shows an example of determination of the seismic event and selection of the shift time value based on the maximum value of the maxima of the cross-correlated functions in a two-humped realization of the cross-correlation maxima.
Figure 5:
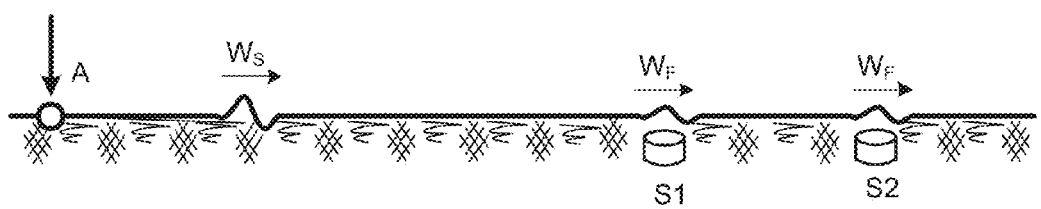
FIG. 5 shows the passage of a seismic wave, at which the two-humpedness of the cross-correlation maxima occurs.

In hard soils, in which the fast wave $W_F$ attenuates much less than in porous soils, the seismic event is represented by two maxima of the selected maximum cross-correlation values (FIG. 4). The diagram of the wave passage for this case is presented in FIG. 5. As is seen from the figure, the fast wave $W_F$ is already in the area of the sensors, and the slow wave $W_S$ is still approaching to the sensor. If the power of the wave $W_F$ is still sufficient, there is the first cross-correlation maximum and the time shift $\Delta T$ is stabilized in its neighborhood. This delay is determined by the velocity of the fast wave $W_F$, whose velocity is approximately by 1.7 times more than that of the slow wave $W_S$. Afterwards, there is the second cross-correlation maximum formed due to the slow wave $W_S$, and the time shift $\Delta T$ is stabilized in its neighborhood as well. For further calculations, it is necessary to select the values of the time difference $\Delta T_{AV}$, corresponding to the second maximum, since the accuracy of its calculation is considerably higher because of the higher resolution in the measurement of $\Delta T$. Therefore, the sequence of the procedures in determination of the time shift $\Delta T_{AV}$ is as follows:

1. The event beginning is determined by sharp increase in the cross-correlation value for one of the pair of sensors.

2. The correlation maximum is found upon determination of the beginning of the event.

3. The value $\Delta T$ is averaged in the neighborhood of the maximum and the averaged value $\Delta T_{AV}$ is calculated.

4. The second cross-correlation maximum is found within the time $T_{MAX}$ after determination of the event beginning.

5. If the second cross-correlation maximum was found, the averaged value $\Delta T_{AV}$ is found in the neighborhood of the second maximum, which is then used for evaluation of the direction to the disturbance source for this specific event.

6. If, within the time $T_{MAX}$ after determination of the event beginning, the second maximum wasn't found, the value $\Delta T_{AV}$ found in the neighborhood of the single maximum is used for evaluation of the direction of the disturbance source for this specific event.

Duration of $T_{MAX}$ is set by the user within (0.3-0.5) s.

Figure 6:
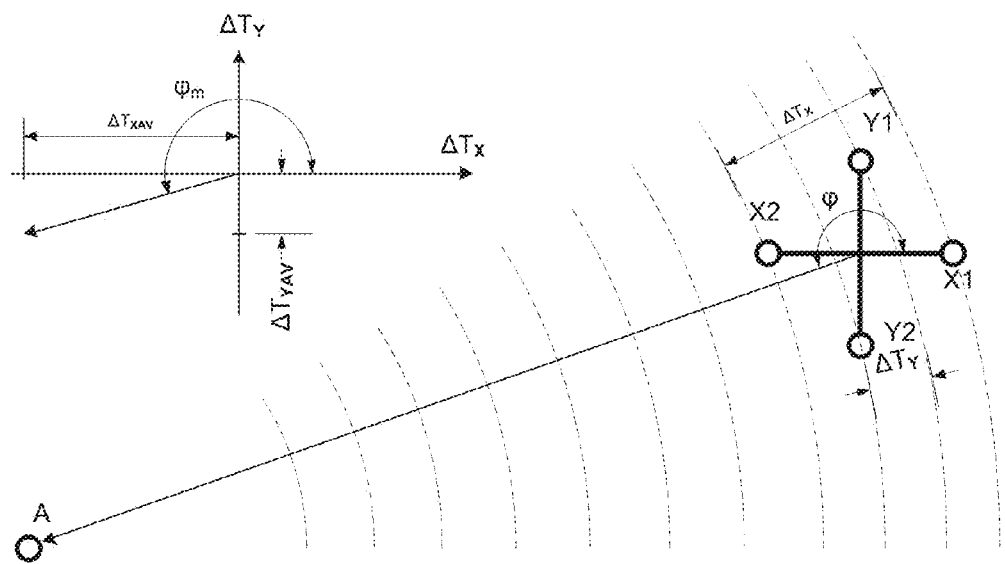
FIG. 6 shows the principle of determination of the azimuth to a seismic disturbance source.

The azimuth to the disturbance source is determined for each recognized seismic event as follows: the time shift values $\Delta T_{XAV}$ and $\Delta T_{YAV}$ are found for the two mutually perpendicular axes (FIG. 6), while the angle $\phi$ between the axis X and direction of the disturbance source is calculated as follows:

$$\varphi_m = \text{ATAN}\left(\frac{\Delta T_{XAV}}{\Delta T_{YAV}}\right), \varphi_m = \text{ATAN}\left(\frac{\Delta T_{XAV}}{\Delta T_{YAV}}\right) + \pi, \text{ At } \Delta T_{XAV} < 0 \quad (1)$$

Figure 7:
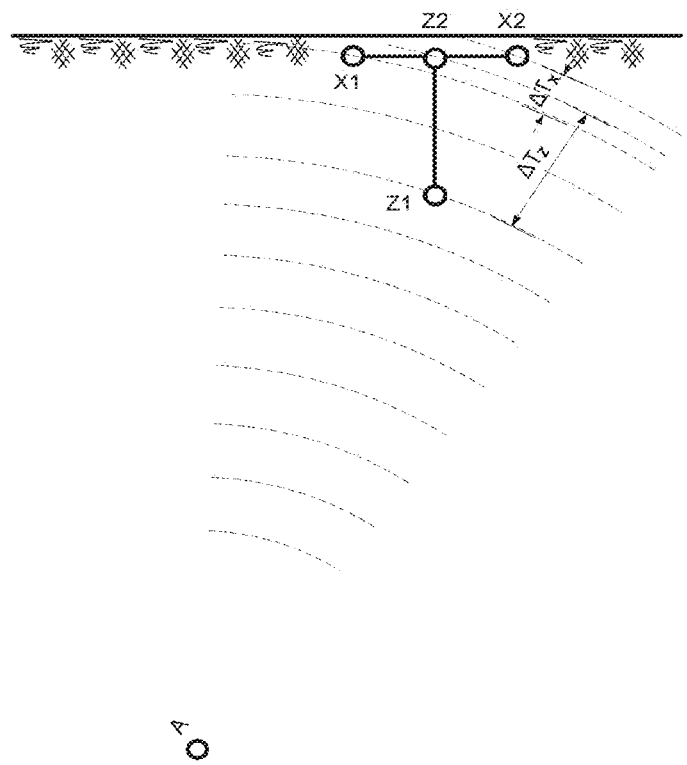
FIG. 7 shows the principle of determination of the three-dimensional direction to a seismic disturbance source when the disturbance source is underground.

In case of determination of the direction to an underground source, the corresponding space angle for each recognized seismic event is determined as follows: three values of delays $\Delta T_{XAV}$, $\Delta T_{YAV}$ and $\Delta T_{ZAV}$ are determined by three mutually perpendicular axes (FIG. 7). The planar angle is determined according to (1), and the angle between the ground surface and direction to the disturbance source is determined according to expression $$\gamma = \text{ATAN}\frac{\Delta T_{ZAV}}{\sqrt{\Delta T_{XAV}^2 + \Delta T_{YAV}^2}} \quad (2)$$

The detector, implementing the described method (FIG. 8), contains several pairs 1 of seismic sensors receiving only vertical oscillations, a respective quantity of the signal pair processing units 2, logic unit 3, multi-channel integrator 4 and unit 5 for evaluation of the angle to the seismic event source, the inputs of the signal pair processing units 2 being connected to the outputs of the corresponding sensors, the first outputs of units 2 connected to the separate inputs of the logic unit 3, the second outputs of units 2 connected to the corresponding inputs of the multi-channel integrator 4, outputs of the integrator 4 connected to the corresponding inputs of the direction evaluation unit 5, the first output of the logic unit 3 and the output of the unit 5 being the device outputs, and the second output of the logic unit 3 being connected to the enabling input of the direction evaluation unit 5.

Figure 9:
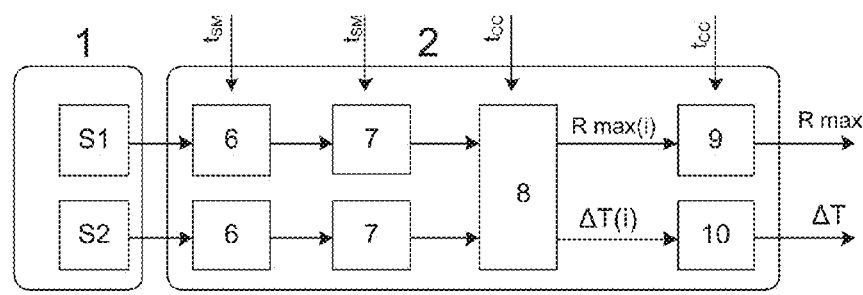
FIG. 9 shows the block-diagram of a signal processing device for one pair of seismic sensors.

The signal pair processing unit 2 (FIG. 9) contains, in turn, two channels of sequentially connected analog-to-digital converters 6 and bandpass filters 7, the cross-correlation function calculator 8, and two integrating filters 9 and 10, the inputs of the analog-to-digital converters 6 being connected to the outputs of sensors S1 and S2, the inputs of the calculator 8 connected to the outputs of the bandpass filters 7, the first output of the cross-correlation calculator connected to the input of the integrating filter 9, the second output connected to the input of the integrating filter 10, and the outputs of the filters being the outputs of the signal pair processing unit.

The output signals of pair 1 of the sensors are processed by the unit 2. The output analogue signals of the sensors S1 and S2 are converted to the digital code by the converters 6, filtered by the filters 7, and come to the input of the cross-correlated function calculator 8. Digital conversion and filtering are performed at the sampling interval $t_{SM}$, and the cross-correlation is recalculated at each interval $t_{CC}$, whereby $t_{SM}=0.25$ ms and $t_{CC}=1$ ms in the proposed embodiment.

The bandpass filters 7 attenuates the ultralow-frequency components within (0-20) Hz, as well as the high-frequency components over (120-150) Hz. Calculated results of the cross-correlation function are filtered by filter 9. As result, the smoothed cross-correlation curve allows to determinate single value $R_{MAX}$ (i) and corresponded to it $\Delta T$ (i) value. The $\Delta T$ (i) samples are filtered by the filter 10.

The seismic detector contains several pairs 1 of seismic sensors and processing units 2. Values $R_{MAX}$ (i) from all processing units come to the logic unit 3, and $\Delta T$ (i) values from all processing units come to the multi-channel integrator 4. The time shift values are averaged by the integrator 4, and the averaged values $\Delta T_{AV}$ of all N channels come to the unit 5 for evaluations of the direction to the disturbance source. In case of detection of a seismic event, the logic unit generates an alarm signal and enabling signal of Tw duration, corresponding to the cross-correlation maximum as per FIG. 3 or corresponding to the second maximum as per FIG. 4. The unit 5 thus latches the current input values $\Delta T_{AV}$ of all N channels and the direction angle to the seismic disturbance source is calculated as single result per each recognized event.

Figure 8:
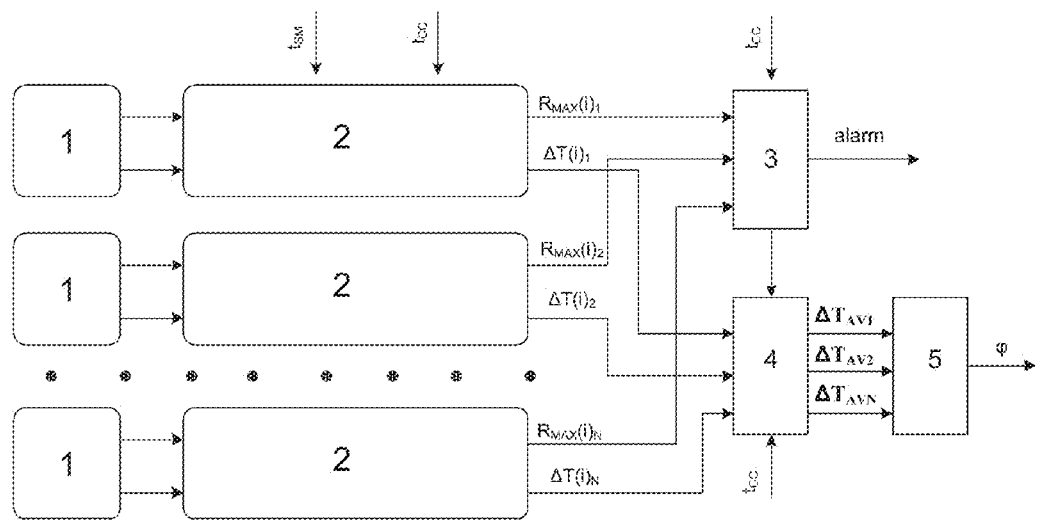
FIG. 8 shows the block-diagram of a seismic detector built on the basis of several pairs of seismic sensors.
Figure 10:
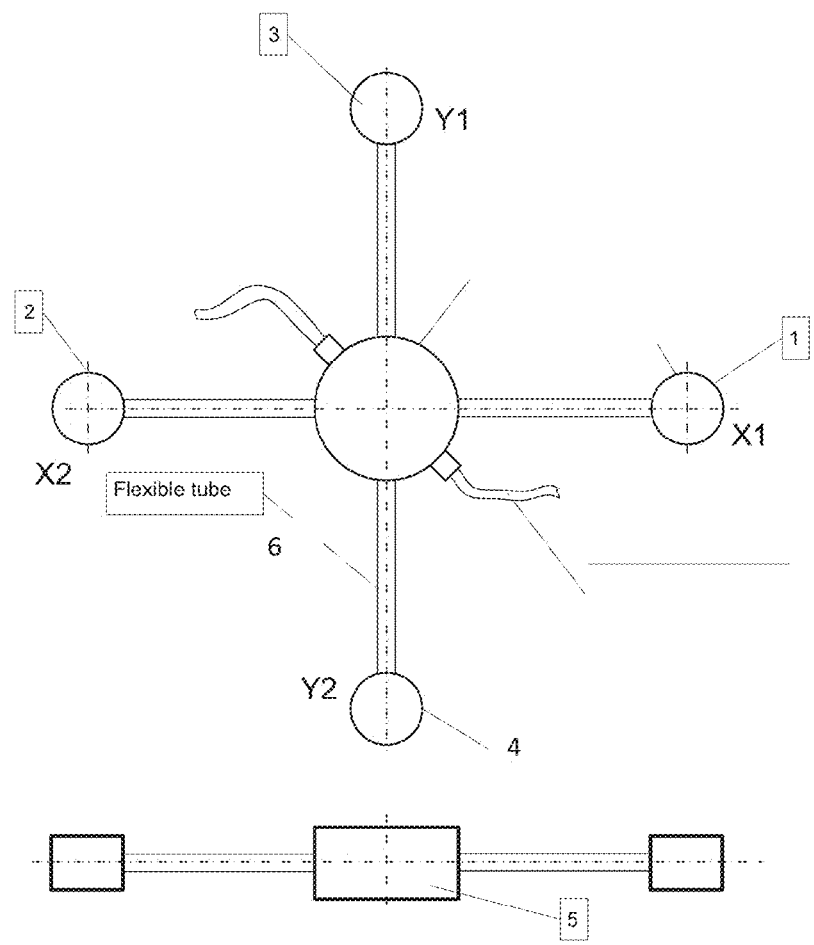
FIG. 10 shows the alternative implementation of the detector determining the azimuth to the disturbance source.

The seismic detector, determining the azimuth to the disturbance source, is implemented by a two-channel system, FIG. 8. Two pairs of sensors are thus arranged mutually perpendicularly (see FIG. 6). Structurally, this detector (FIG. 10) consists of four sensors 1, 2, (X1 and X2) 3, 4 (Y1 and Y2), connected to the central device 5 by flexible fixing elements 6, which allows each sensor to receive the seismic waves independently from each other. For example, a thick-walled plastic tube provides a hermetic connection of sensors to the central unit and sets fixed distances between the sensors in each pair. The direction to the seismic disturbance source is calculated according to expression (1).

Figure 12:
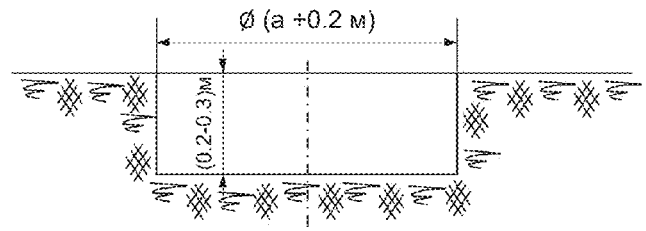
FIG. 12 shows the dimensions of a hole for installation of the detector determining the surface azimuth to a disturbance source.

The detector is installed in ground; dimensions of the hole for installation of the detector are shown in FIG. 12. The dimension a=0.5 m is determined to be optimum.

Figure 11:
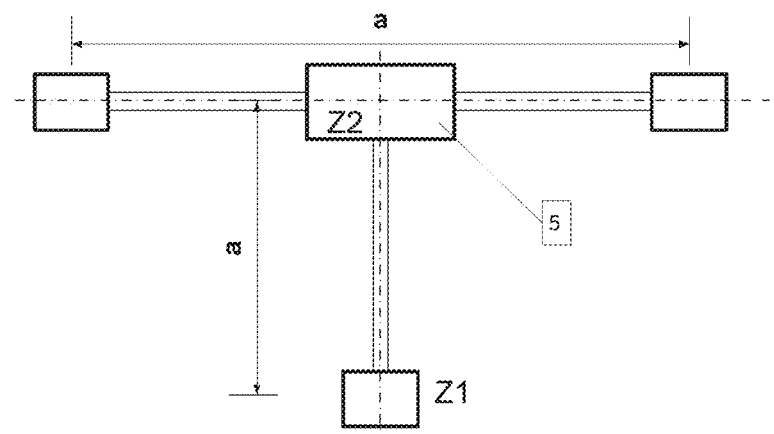
FIG. 11 shows the alternative implementation of the detector determining the three-dimensional direction to an underground seismic disturbance source.

The detector determining the direction to the disturbance source in a three-dimensional space, is implemented by the three-channel system, FIG. 8. An additional pair of sensors Z1 and Z2 is thus placed vertically at the distance a (FIG. 7). Structurally, a three-dimensional detector (FIG. 11) is built similarly to the two-component detector. The sensor Z2 is mounted in the central device, and the sensor Z1 is lowered at the distance a from the central unit. One of the sensors X1, X2, Y1, or Y2 can be used as the sensor Z2. The direction of the seismic disturbance source is calculated according to expression (2).

Figure 13:
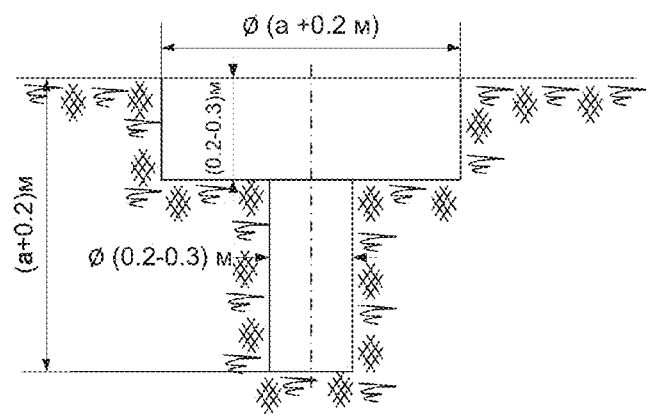
FIG. 13 shows the dimensions of a hole for installation of the detector determining the three-dimensional direction to an underground seismic disturbance source.

The three-dimensional detector is mounted in a hole of similar dimensions (FIG. 13), but a central hole (0.2-0.3) m in diameter and (a+0.2$_M$) in depth from the ground surface is drilled for the sensor Z1.

Figure 14:
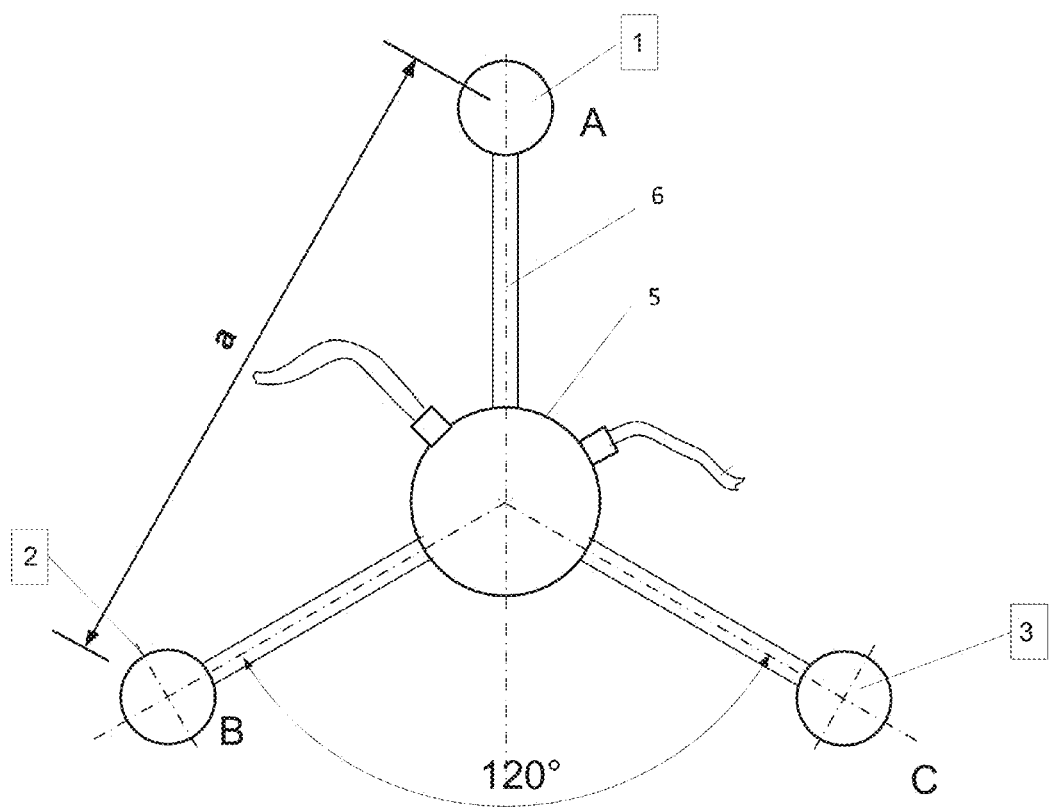
FIG. 14 shows another detector implementation example built on the basis of three sensors, placed at an angle of 120°.

Similarly, a detector with non-orthogonal axes of the sensor pairs can be constructed. For example, FIG. 14 shows the detector built on the basis of three sensors placed at the angle of 120°. The distance between all sensors is a, and all three sensors form three pairs, for which the delays $\Delta T_{AB}$, $\Delta T_{BC}$, $\Delta T_{CA}$ are calculated according to the disclosed method and device. The vector sum of any two of the detected time shift values represents a vector directed to the seismic disturbance source.

The implementation of the detector containing four sensors for the two-dimensional case (two orthogonal pairs of the sensors) and six sensors for a three-dimensional case (three orthogonal pairs of the sensors) is used as basic embodiment of the detector. Minimal and extended embodiments of the detector are also possible. Generally, the detector embodiment can contain an arbitrary number of the sensors, where the pairs of the sensors must not be orthogonal, and the distances between the sensors of the pair must not be the same for different pairs.

The minimal possible implementation of the detector contains three sensors for the two-dimensional case (for example, two orthogonal pairs of the sensors, where one of the sensors is common for both pairs) and four sensors for the three-dimensional case (for example, three orthogonal pairs of the sensors, where one sensor is common for three pairs).

The extended embodiment of the detector can contain, for example, five sensors, forming four pairs, for the two-dimensional case. Such embodiment of the detector, after calculation of the time differences for each pair, allows, by means of the known method TDOA and known algorithms, to determine, except for the direction, the average disturbance velocity and distance to the disturbance source for each recognized seismic event.

What is claimed is:

1. A seismic detector for recognition of a seismic event comprising:
    seismic sensors receiving vertical only oscillations of the ground, the seismic sensors being grouped in pairs, each sensor of each pair being connected to an input of a corresponding analog-to-digital converter of a signal pair processing unit;
    first outputs of each signal pair processing unit being connected to a logic unit recognizing the seismic event, and second outputs of each signal processing unit being connected to an evaluation unit of a direction of a source of the seismic event;
    a first output of the logic unit being an output of the seismic detector, and a second output of the logic unit being connected to enabling input of the logic unit for evaluation of the direction to the seismic event source; and
    each signal pair processing unit comprising two bandpass filters, cross-correlation calculator with a searching for the maximum value and corresponding time shift value and two integrating filters, whereby the inputs of the bandpass filters are connected to the outputs of the analog-to-digital converters, the outputs of these filters are connected to the cross-correlation calculator inputs, and the calculator outputs are connected to the inputs of the integrating filters, the outputs of which are the outputs of the signal pair processing unit.

2. The seismic detector according to claim 1, further comprising a multi-channel integrator having its inputs are connected to the second outputs of the signal pair processing units, and the outputs of the multi-channel integrator fife being connected to corresponding inputs of the evaluation unit of the direction to the seismic event source.

3. The seismic detector according to claim 2, further comprising two pairs of the seismic sensors disposed mutually perpendicularly and two signal processing units for two pairs of the sensors in order to determine the direction to a surface seismic disturbance source.

4. The seismic detector according to claim 3, wherein a distance between sensors in each pair is the same in all pairs and is ranged within (0.4-0.8) m.

5. The seismic detector according claim 2, further comprising three pairs of the seismic sensors disposed mutually perpendicularly and three signal processing units for three pairs of the sensors in order to determine the direction to a seismic disturbance source in a three-dimensional space.

6. The seismic detector according to claim 5, wherein a distance between sensors in each pair is the same in all pairs and is ranged within (0.4-0.8) m.

7. The seismic detector according to claim 2, wherein a distance between sensors in each pair is the same in all pairs and is ranged within (0.4-0.8) m.

8. The seismic detector according to claim 1, further comprising two pairs of the seismic sensors disposed mutually perpendicularly and two signal pair processing units for two pairs of the sensors in order to determine the direction to a surface seismic disturbance source.

9. The seismic detector according to claim 8, wherein a distance between sensors in each pair is the same in all pairs and is ranged within (0.4-0.8) m.

10. The seismic detector according to claim 1, further comprising three pairs of the seismic sensors disposed mutually perpendicularly and three signal processing units for three pairs of the sensors in order to determine the direction to a seismic disturbance source in a three-dimensional space.

11. The seismic detector according to claim 10, wherein a distance between sensors in each pair is the same in all pairs and is ranged within (0.4-0.8) m.

12. The seismic detector according to claim 1, wherein a distance between sensors in each pair is the same in all pairs and is ranged within (0.4-0.8) m.

* * * * *